US009283875B1

(12) United States Patent
Pellettiere

(10) Patent No.: US 9,283,875 B1
(45) Date of Patent: *Mar. 15, 2016

(54) SEAT CUSHION

(75) Inventor: Joseph A. Pellettiere, Centerville, OH (US)

(73) Assignee: The United States of America as represented by the Secretary of the Airforce, Washington, DC (US)

(*) Notice: Subject to any disclaimer, the term of this patent is extended or adjusted under 35 U.S.C. 154(b) by 997 days.

This patent is subject to a terminal disclaimer.

(21) Appl. No.: 13/453,200

(22) Filed: Apr. 23, 2012

Related U.S. Application Data

(63) Continuation-in-part of application No. 12/559,602, filed on Sep. 15, 2009, now Pat. No. 8,181,292.

(51) Int. Cl.
A47C 27/10 (2006.01)
B60N 2/42 (2006.01)
B60N 2/44 (2006.01)
A47C 27/08 (2006.01)

(52) U.S. Cl.
CPC ............ B60N 2/4415 (2013.01); A47C 27/083 (2013.01)

(58) Field of Classification Search
CPC .................................................... B60N 2/4415
USPC ........... 5/654, 655.3, 713; 244/122 R, 122 A; 297/216.1, DIG. 3
See application file for complete search history.

(56) References Cited

U.S. PATENT DOCUMENTS

| 5,427,331 | A | 6/1995 | Stroud |
| 5,558,398 | A | 9/1996 | Santos |
| 6,014,784 | A | 1/2000 | Taylor et al. |
| 6,055,473 | A * | 4/2000 | Zwolinski et al. ............... 701/49 |
| 6,203,105 | B1 * | 3/2001 | Rhodes, Jr. ................. 297/284.6 |
| 6,312,049 | B1 | 11/2001 | Sullivan et al. |
| 6,422,087 | B1 * | 7/2002 | Potter ............................. 73/731 |
| 6,739,657 | B2 | 5/2004 | Heilig et al. |
| 7,758,121 | B2 | 7/2010 | Browne et al. |
| 8,181,292 | B1 * | 5/2012 | Pellettiere ......................... 5/654 |
| 2002/0047295 | A1 | 4/2002 | Sullivan et al. |
| 2005/0258090 | A1 * | 11/2005 | Gernon ......................... 210/222 |
| 2007/0246285 | A1 | 10/2007 | Browne et al. |
| 2007/0246979 | A1 * | 10/2007 | Browne et al. ........... 297/216.12 |
| 2008/0296946 | A1 * | 12/2008 | Reynolds et al. .......... 297/284.6 |
| 2008/0303326 | A1 * | 12/2008 | Booth et al. ............... 297/284.2 |
| 2010/0036567 | A1 * | 2/2010 | Gandhi .......................... 701/49 |
| 2011/0270422 | A1 * | 11/2011 | Chang et al. .................... 700/30 |
| 2012/0186003 | A1 * | 7/2012 | Heger et al. ...................... 2/412 |

* cited by examiner

Primary Examiner — Michael Trettel
(74) Attorney, Agent, or Firm — AFMCLO/JAZ; Jason Sopko

(57) ABSTRACT

A semi-active seat cushion and method of using the same. In one embodiment, the semi-active seat cushion comprises a plurality of chambers for containing a pressurized fluid, wherein each chamber is connected to at least one other chamber by an orifice that provides a fluid connection; a supply conduit for supplying a pressurized fluid to each of the plurality of chambers; and at least one relief valve that permits rapid and controlled deflation of the plurality of chambers. In another embodiment, the semi-active seat cushion comprises a smart fluid; a plurality of chambers configured for containing the smart fluid; a field generator; and a field controller.

9 Claims, 5 Drawing Sheets

SEAT CUSHION

CROSS-REFERENCE TO RELATED APPLICATIONS

This application is a continuation of and claims priority from co-pending U.S. Utility patent application Ser. No. 12/559,602 filed on Sep. 15, 2009 by inventor Joseph A. Pellettiere, and entitled "Seat Cushion," now U.S. Pat. No. 8,181,292, which is hereby incorporated herein by reference in its entirety.

RIGHTS OF THE GOVERNMENT

The inventions described herein may be manufactured and used by or for the Government of the United States for all governmental purposes without the payment of any royalty.

BACKGROUND OF THE INVENTION

Seat cushions currently used in automotive, aircraft, and military vehicles are generally passive in nature. That is, they rely on the use of rate sensitive foams to cushion occupants and absorb energy transmitted from routine vehicle use, as well as from high energy events such as impacts and the catapult phase of an ejection in the case of aircraft. While these foams may reduce the probability of injury by slightly lowering the spinal loads to which an occupant is exposed, they have several limitations. Conventional passive foams are very sensitive to environmental conditions such as temperature, humidity, and age. Each of these conditions reduces the effectiveness of the foams. As such, their performance is generally difficult to accurately quantify or predict. In addition, their passive nature prevents them from adjusting to the contours of each individual or adjusting to a particular impact event. Conventional passive foams also do little to isolate and minimize vibrations transmitted to occupants during routine use of various vehicles such as automobiles and other ground vehicles, airplanes, and rotorcraft.

With the increased tempo of military operations, including combat missions that may extend to 40 hours or more, such limitations can adversely affect air crew comfort and effectiveness. Moreover, current ejection seats create discomfort, soreness, and numbness and increase overall operator fatigue, particularly during extended missions. Another limitation of passive cushions is that they can only absorb a certain amount of energy in a particular way and therefore cannot be designed to provide optimal support and energy absorption for different conditions such as different-sized occupants and different impact levels. Typical designs of passive cushions are directed to mid-sized males. If a heavier person uses the system, the cushion may be pre-compressed beyond the point at which it has been designed to absorb any additional impact energy. Conversely, if a smaller person uses the system, he or she may not sufficiently load the system during impact to absorb the energy. These are inherent limitations found in current designs that use passive cushions and foams.

SUMMARY OF THE INVENTION

The seat cushions disclosed herein use a novel technique to dynamically control the stiffness and energy absorption properties of a seat cushion during routine use and during impact or ejection. The seat cushions are actively controlled, and they can self-contour to provide an optimal seat interface for crew members of different size, while also providing optimal safety properties during high energy events such as impacts and ejections. In addition, the seat cushions provide absorption, isolation, and damping of vibrational motion transmitted to occupants during routine vehicle motion and use.

These seat cushions demonstrate the benefits of active control versus passive control for reducing physical fatigue and increasing impact safety. With active control, the limitations of a fixed cushion thickness and contour can be mitigated through application of real-time control of the material properties. This control is especially useful in absorbing energy during impacts, ejections, and other sudden, higher energy events.

Another advantage of this semi-active system is its ability to absorb the maximum amount of energy for a diverse population of users and events. Thus, its safety margin is higher than passive cushions and other currently available cushions. In addition, because the properties of the seat cushion can be adjusted continually, the influence of environmental factors can be minimized so that they do not degrade the performance and energy absorption characteristics of the seat cushions.

A semi-active seat cushion according to one embodiment comprises: a plurality of chambers for containing a pressurized fluid, wherein each chamber is connected to at least one other chamber by an orifice that provides a fluid connection; a supply conduit for supplying a pressurized fluid to each of the plurality of chambers; and at least one relief valve that permits rapid and controlled deflation of the plurality of chambers.

A method of absorbing energy in a seat cushion comprises the steps of: supplying a pressurized fluid to each of a plurality of chambers of a seat cushion, wherein the plurality of chambers are in fluid communication with one another; sensing an event; and releasing the pressurized fluid from each of the plurality of chambers of the seat cushion in a controlled manner in response to the sensed event to absorb the optimal amount of energy, thereby reducing the amount of energy that is received by an occupant of the seat cushion.

A semi-active seat cushion system according to another embodiment comprises: a pressurized fluid source; a plurality of chambers for containing a pressurized fluid, wherein each chamber is connected to at least one other chamber by an orifice that provides a fluid connection; a supply conduit for supplying a pressurized fluid to each of the plurality of chambers; a relief valve that permits rapid and controlled deflation of the plurality of chambers; and a controller connected to the relief valve to open the relief valve and control the rate of release of pressurized fluid from the plurality of chambers to optimize the amount of energy that is absorbed by the seat cushion.

A method of absorbing energy and isolating vehicular vibrational motion in a seat cushion comprises the steps of: supplying a pressurized fluid to each of a plurality of chambers of the seat cushion, wherein the plurality of chambers are in fluid communication with one another; sensing whether the seat cushion is operational; continuously receiving sensor data from a plurality of sensors; determining whether vehicular vibrational motion transmitted to an occupant of the seat cushion exceeds a predetermined threshold amount; and opening one or more relief valves to release pressurized fluid from one or more of the plurality of chambers of the seat cushion in a controlled manner according to an optimized control law such that the seat cushion absorbs the optimal amount of energy and decreases vehicular vibrational motion transmitted to the occupant.

A semi-active seat cushion system according to an alternative embodiment comprises: a smart fluid, wherein at least one property of the smart fluid is altered by application of an electromagnetic field; a plurality of chambers configured for containing the smart fluid, wherein at least one chamber is connected to at least one other chamber by an orifice that permits the smart fluid to flow between the chambers; at least one field generator, wherein the field generator is configured to produce the electromagnetic field, the field generator being capable of altering an intensity of the electromagnetic field; and a field controller in communication with the field generator, wherein the field controller controls the intensity of the electromagnetic field generated by the field generator to optimize the amount of energy that is absorbed by the seat cushion.

An alternative method of absorbing energy and damping vehicular vibrational motion in a seat cushion comprises the steps of: supplying a smart fluid to each of a plurality of chambers of the seat cushion, wherein at least some of the plurality of chambers are in fluid communication with one another; sensing whether the seat cushion is operational; supplying an electromagnetic field having a first field intensity, wherein at least one property of the smart fluid is altered upon application of the electromagnetic field having the first field intensity; continuously receiving sensor data from a plurality of sensors; determining whether the vehicular vibrational motion transmitted to an occupant of the seat cushion exceeds a predetermined threshold amount; altering the first field intensity in a controlled manner according to an optimized control law to create a second field intensity, wherein at least one property of the smart fluid is altered upon application of the electromagnetic field having the second field intensity such that the seat cushion absorbs the optimal amount of energy and decreases vehicular vibrational motion transmitted to the occupant.

DETAILED DESCRIPTION

The disclosed seat cushion uses a semi-active technology. Modeling work has demonstrated the utility of algorithms that may be used to optimize the mechanical properties of seat cushions during a high energy event such as an ejection or an impact by controlling the release of pressurized fluid in the seat cushions. In addition, the actively controlled seat cushions may be used to isolate, dampen, and minimize vibrations transmitted to occupants of the seat cushions during routine vehicle motion and use.

Figure 1:
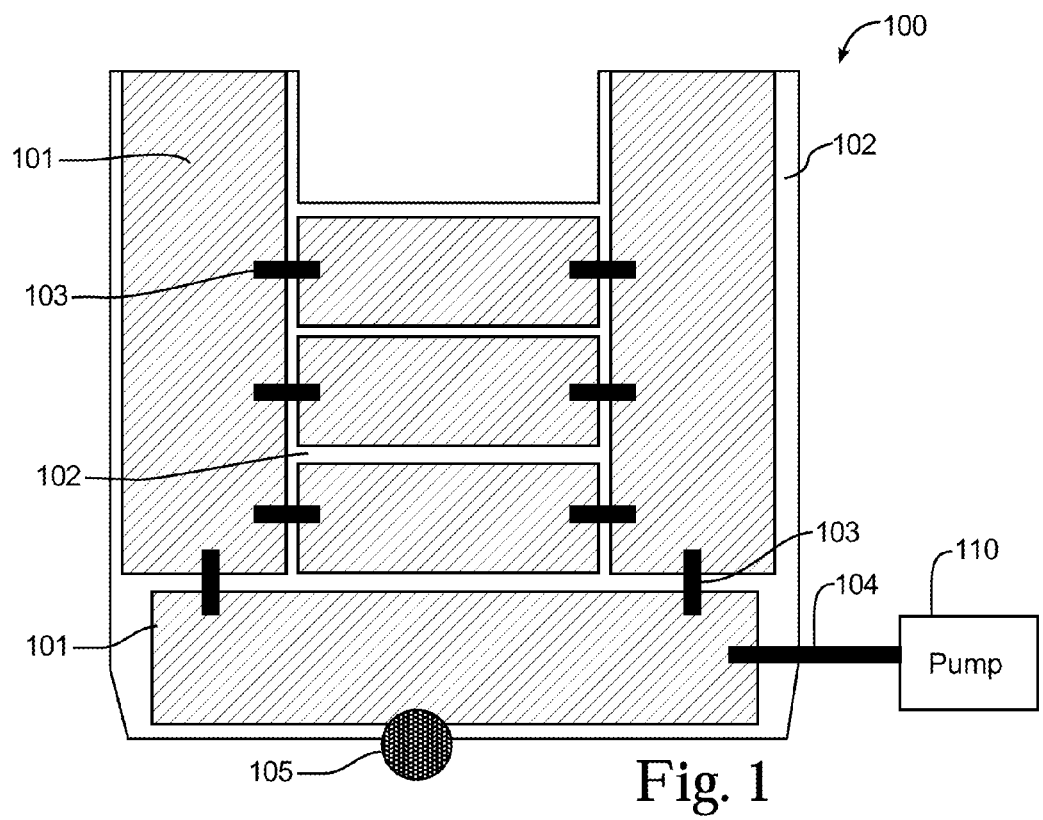
FIG. 1 is a top, cross-sectional view of a seat cushion according to one embodiment.

In one embodiment, a seat cushion 100 as shown in FIG. 1 includes a plurality of chambers 101. Each chamber 101 may be the same size and configuration, or the chambers 101 may be different sizes and configurations. Each chamber 101 is wrapped inside a layer of comfort foam 102. The foam layer 102 may smooth the surface of the seat cushion 100 between the air chambers 101 to eliminate gaps that may be created by chambers 101 of different sizes. The foam layer 102 also provides a backup source of cushioning should a leak develop in one of the chambers 101. A sheepskin cover or similar material (not shown) is placed on top of the chambers 101 and the foam layer 102. In one embodiment, each chamber 101 is approximately two inches in total thickness including the foam layer 102. Persons skilled in the art will understand that the thickness of the foam layer 102 and each chamber 101 may be varied, as desired, to satisfy different operational requirements and conditions. Moreover, materials other than comfort foam may be used.

The chambers 101 are connected to one another by one or more orifices 103. The orifices 103 permit fluid such as air to flow between the chambers 101. The orifices 103 enable each chamber 101 to contain fluid at a different pressure, for example, based on different forces received from different occupants of the seat cushion 100, or from differences resulting from the chambers 101 being filled from a single pressurized fluid source. The capability of the chambers 101 to contain fluids at different pressures enables different regions of the occupant's body to be supported with differing amounts of force by the seat cushion 100. This differential pressure distribution capability also enables the seat cushion 100 to contour to a diverse population, including a wide range of anthropometry and different genders. The level of pressure in each chamber 101 may be adjusted to the occupant and may vary with time. The aperture (not shown) in each orifice 103 may be the same or it may be different and may be sized to provide semi-active cushioning for ejections, impacts, and other similar events, as well as for isolating and damping vibration transmitted to vehicle occupants during routine vehicle use. The orifices 103 allow pressurized fluid to flow between the chambers 101 so that the pressure in each chamber 101 may change. The orifices 103 also allow fluid to flow from the chambers 101 and the seat cushion 100 so that the seat cushion 100 may absorb the energy during a high energy event such as an impact and during routine vehicle use.

Pressurized fluid such as air is supplied to the chambers 101 by a supply conduit 104 that is connected to a source of pressurized fluid such as a pump 110. By adjusting the pressure of the fluid supplied to the seat cushion 100 via the supply conduit 104, the pressure in each chamber 101 may be adjusted. This adjustment permits an optimal pressure to be maintained during flight and operation, while also permitting adjustment of the air pressure in the seat cushion 100, as necessary, to respond to different conditions such as acceleration and the like. The number, size, and configuration of each chamber 101, the foam layer 102, and each orifice 103 may be varied to suit different requirements and operating conditions. For example, the number of chambers 101 may be increased, and the chambers 101 may be placed in more than one layer in the seat cushion 100. The chambers 101 may also be arranged in a serpentine configuration or other configuration to facilitate movement and release of fluid between the chambers 101 and from the seat cushion 100 via a relief valve 105, described below. The pump 110 may provide pressurized air or other pressurized fluid to the seat cushion 100 through more than one supply conduit 104. The pump 110 and its power source may either be self contained within the cushion, or the pump 110 may draw external power, air, and/or fluid pressure from the aircraft, vehicle, or other system in which it is installed.

The seat cushion 100 also includes at least one relief valve 105. The relief valve 105 is connected to one or more of the chambers 101 to permit rapid and controlled deflation of the chambers 101 of the seat cushion 100. In the case of an ejection, the relief valve 105 may release pressurized fluid from each chamber 101 in a controlled manner to absorb the energy from the ejection and prevent or reduce the likelihood of injury to the pilot or operator. The relief valve 105 may be tuned to allow the seat cushion 100 to be quickly deflated in a controlled manner that optimizes the amount of energy that is absorbed by the seat cushion 100. For example, the size of each orifice 103 and opening speed of the relief valve 105 may be tuned to the acceleration pulse that is expected depending upon the type of impact that is anticipated. Upon impact, the relief valve 105 opens to permit the cushion 100 and the chambers 101 to deflate in a preferred manner. The relief valve 105 operates in cooperation with the orifices 103 to release pressurized fluid from the chambers 101. This controlled deflation allows energy from the impact or ejection event to be absorbed in an optimal manner, thereby decreasing the impulse to, and force received by, the occupant, and lowering the risk of a spinal injury. Similarly, the relief valve 105 may be tuned to allow the seat cushion 100 to be quickly deflated in a controlled manner that absorbs, isolates, dampens, and minimizes vibrational motion transmitted to occupants during routine vehicle use. More than one relief valve 105 may be used to release pressurized fluid from the chambers 101 of the cushion 100, as desired, and to adjust the means by which pressurized fluid is released from the chambers 101, altering the energy that is absorbed by the cushion 100 during an event such as an ejection or impact and during routine vehicle use.

Figure 2:
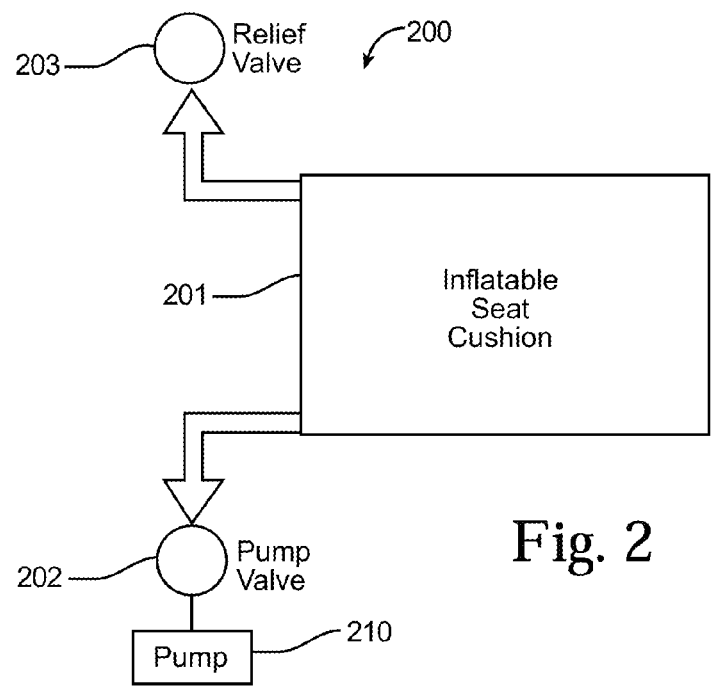
FIG. 2 is a diagram of a seat cushion system.

In another embodiment, a seat cushion system 200 as depicted in FIG. 2 includes an inflatable seat cushion 201, a pump 210, a pump valve 202, and at least one relief valve 203. The pump 210 provides pressurized fluid to the chambers (not shown) of the seat cushion 201. The pump may be a pneumatic cylinder or similar device. The relief valve 203 permits pressurized fluid contained in the chambers of the seat cushion 201 to be released in a controlled manner. In operation, the seat cushion 201 is inflated. The pump valve 202 is opened to permit pressurized fluid such as air from the pump 210 to fill the chambers of the seat cushion 201. When the seat cushion 201 and its chambers are filled to the desired pressure(s), the pump valve 202 is closed. During a high energy event such as an impact or ejection or when vehicular vibrational motion exceeds a predetermined amount, the relief valve 203 is opened to permit the pressurized fluid in each chamber 201 to escape from the seat cushion 201 in a controlled manner. By controlling this release, the seat cushion 201 may absorb the maximum energy possible, thereby protecting the occupant to the maximum extent possible. The rapid pressure relief of the cushion 201 by the relief valve 203 only occurs in response to a triggering event such as an impact or ejection or when vibrational motion exceeds a predetermined amount.

To determine when such pressure relief is necessary, the seat cushion system 200 may use data from a variety of existing crash/impact sensors in the vehicle to sense a triggering event and to trigger the depressurization of the seat cushion 201. In the case of impacts and ejections, the seat cushion system 200 may use an internal custom-developed crash sensor or a mechanical threshold switch, or the seat cushion system 200 may have defined failure points developed into the seat cushion system 200. Algorithms may be developed for each application to determine the optimum operation of the relief valve 203. Inputs to each algorithm may include but are not limited to the size of the occupant, the instantaneous pressure, the impact level and desired safety level, and the predetermined threshold amount of vibrational motion. The output would be a control law that governs the opening and closing the relief valve 203, as well as design guidance on the size of the relief valve 203. Moreover, more than one relief valve 203 may be used in the seat cushion system 200 to control the release of pressurized fluid during a triggering event.

The relief valve 203 may be a mechanical or an electronic valve. If the relief valve 203 is a mechanical valve, the valve size and opening speed may be selected to provide the desired control parameters for absorbing the maximum amount of energy. The size of the relief valve 203 will be determined by the volume of fluid expected to be present in the seat cushion 201 and the amount of time necessary to deflate the seat cushion 201. To achieve the optimum safety level, more than one relief valve 203 may be necessary. If the relief valve 203 is electronic, its operation is controlled by software and algorithms to provide the optimal safety and to absorb the maximum amount of energy. This derivation may be custom-developed depending on the volume of air in the seat cushion 201, the impact profile, the safety margin, and other factors.

In an alternate embodiment, the pump valve 202 may be a check valve or similar valve that is designed to open upon a high energy event such as an impact or ejection to release pressurized fluid in the seat cushion 201. When an event such as an impact or ejection occurs, and the pressure in the seat cushion 201 exceeds the limits of the pump valve 202, the pump valve 202 opens and the seat cushion 201 is deflated, thereby absorbing some of the impact energy. The pump valve 202 may be designed to open and release pressurized fluid from the seat cushion 201 in a controlled manner that maximizes the energy absorbed by the seat cushion 201. The pump valve 202 is typically controlled for slower inflation and deflation during normal operations. When an impact event is sensed, the pump valve 202 may be opened according to the control laws to deflate the seat cushion 201. In this embodiment, the pump valve 202 may be either the sole means of deflation, or it may be coupled with a dedicated relief valve 203, or multiple relief valves 203. The developed software and control algorithms will account for either method.

Figure 3:
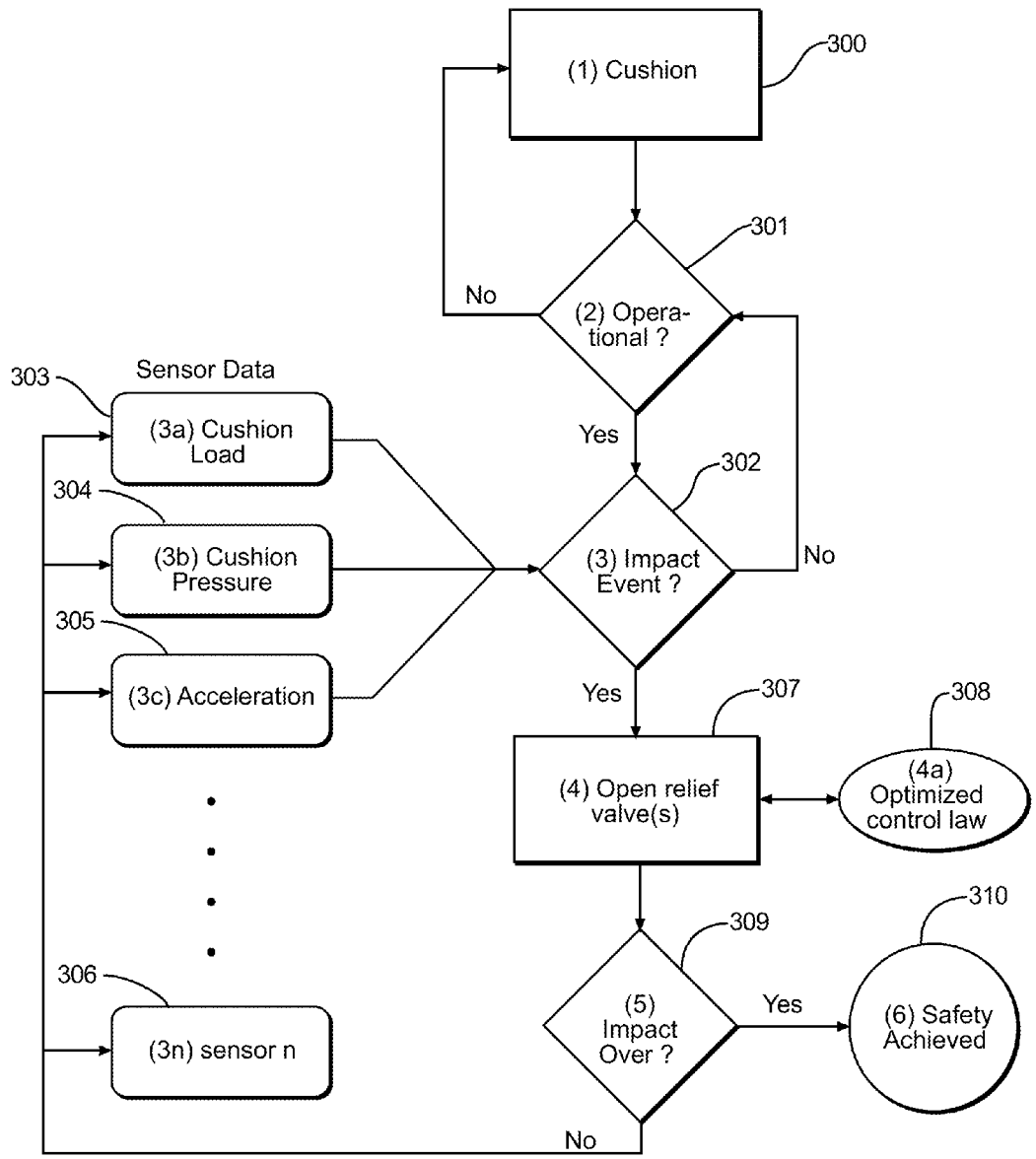
FIG. 3 is a flowchart of one embodiment a seat cushion program for absorbing energy during and after high energy events such as impacts and ejections.

The present invention further includes a control program for the seat cushion. In the embodiment depicted in FIG. 3, the control program operates in the following manner. In step (1) 300, the program runs initialization routines to determine if a seat cushion is present. If a seat cushion is not detected, the program does not run any further routines, but rather continues to run a routine to determine if the seat cushion is present. If a seat cushion is detected in step (1) 300, the program runs a routine to determine if the seat cushion is operational in step (2) 301. If the seat cushion is not in an operational mode, the program may perform various diagnostic routines to identify the source of the problem that prevents the seat cushion from being operational and may inform an operator or maintenance person of the problem. If the seat cushion is determined to be operational in step (2) 301, the program then runs various routines in step (3) 302 to determine if an impact event or other high energy event has occurred. The routines that are run in step (3) 302 receive sensor data from one or more sensors in steps (3a-3n) 303-306. The sensors may include a load sensor in step (3a) 303, a current pressure sensor in step (3b) 304, an acceleration sensor in step 3(c) 305, and any additional sensors n in step 3(n) 306. The program may receive data from other sensors, if desired, to determine if a high energy event such as an impact or an ejection has occurred. If the program does not detect an impact event from the sensor data in step (3) 302, the program continues to monitor whether the seat cushion is operational, as in step (2) 301.

If the program receives sensor data indicating that an impact event has occurred in step (3) 302, the program opens one or more relief valves to release pressurized fluid from the seat cushion in step (4) 307. The program controls opening of the relief valve according to an established optimized control law in step (4a) 308 to ensure that the optimal amount of energy is absorbed. This process in step (4a) is determined through an analytical optimization process taking into consideration seat cushion properties, impact profile, and safety level. The optimized control law is determined during cushion development, and it is programmed as part of the controller for the cushion operation program. The program continues to monitor and control deflation of the seat cushion in step (5) 309 until the event is over. To determine if an impact, ejection, or other high energy event has ended in step (5) 309, the program continues to receive sensor data from one or more sensors. If the sensor data received in step (5) 309 indicates that the event is not over, the program continues to receive and evaluate sensor data at step (3) 302 and control opening of the relief valves in step (4) 307 according to the optimized control law in step (4a) 308. The program continues to receive and evaluate sensor data until it is determined that the event is over at step (5) 309. The controller may also store the sensor and valve data to aid in a post-event analysis. Once the program determines that the event is over at step (5) 309, the program determines whether optimum safety was achieved in step (6) 310. This may be determined by evaluating the sensor data compared to the pressure released in step (4) 307 via the optimized control law to determine whether the optimum amount of energy from the event was absorbed by the cushion.

Figure 4:
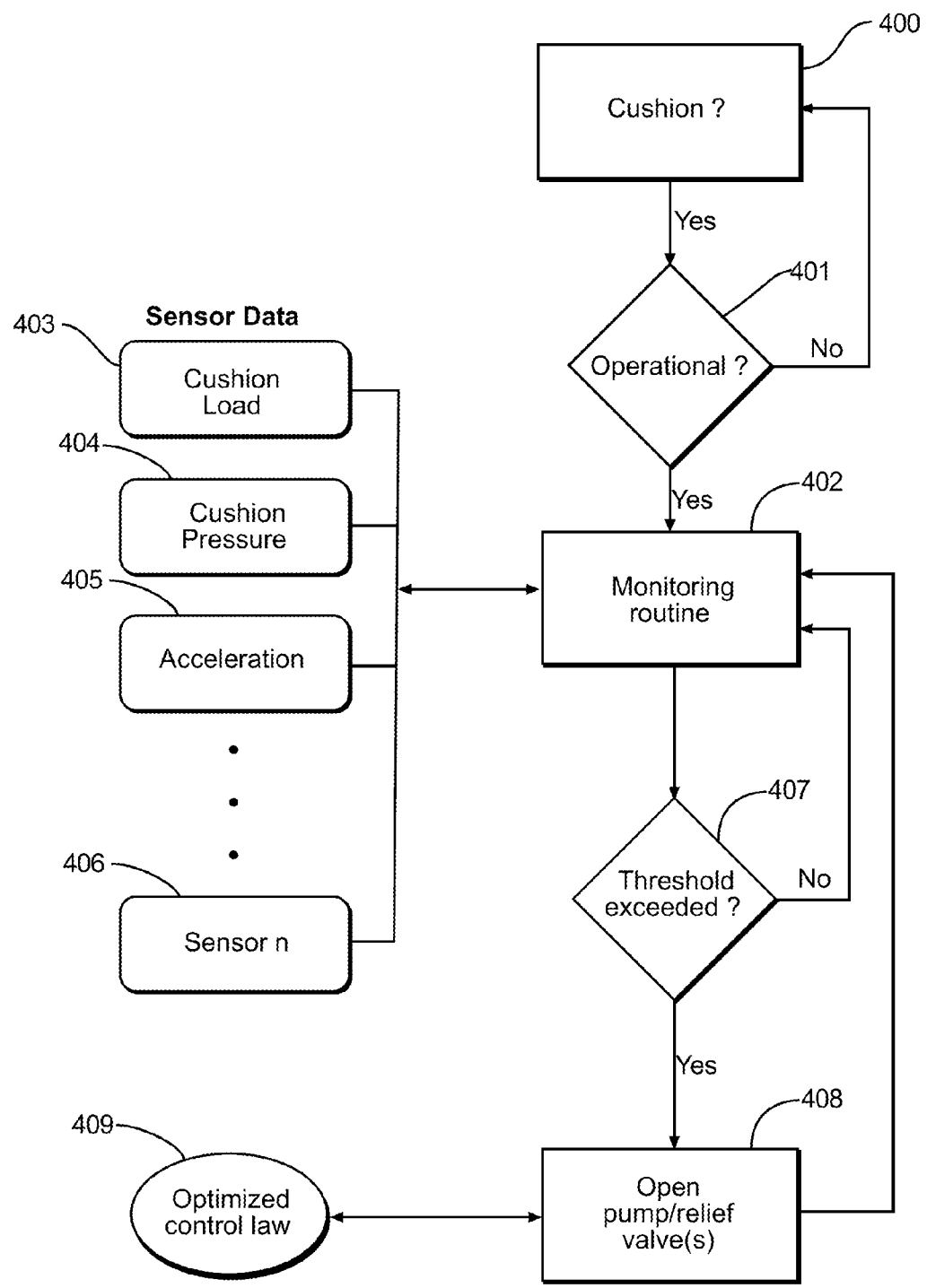
FIG. 4 is a flowchart of one embodiment of a seat cushion program for isolating and damping vibrations that occur during routine vehicle use.

In an alternative embodiment, a control program for the seat cushion operates in the following manner as depicted in FIG. 4. In step 400, the control program runs initialization routines to determine if a seat cushion is present, and in step 401, the control program runs a routine to determine if the seat cushion is operational. If a seat cushion is not detected, the program does not run any further routines, but rather continues to run a routine to determine if the seat cushion is present. If the seat cushion is detected but is not in an operational mode, the control program may perform various diagnostic routines to identify the source of the problem that prevents the seat cushion from being operational and may inform an operator or maintenance person of the problem. If the seat cushion is determined to be operational in step 401, the control program begins running a monitoring routine in step 402 to continually assess the current acceleration and motion of the seat cushion. The routines that are run in step 402 receive sensor data from one or more sensors in steps 403-406. The sensors may include a cushion load sensor in step 403, a current pressure sensor in step 404, an acceleration sensor in step 405, and any additional sensors n in step 406.

Based on sensor data received from one or more sensors in steps 403-406, the control program determines in step 407 whether vehicular vibrational motion transmitted to the occupant of the seat cushion has exceeded a predetermined threshold amount. If the predetermined threshold amount has not been exceeded, the control program resumes the monitoring routine in step 402 to receive sensor data from one or more sensors in steps 403-406. If the control program determines in step 407 that the predetermined threshold amount has been exceeded, the control program in step 408 may open the pump valve to permit pressurized fluid from the pump to fill one or more of the chambers of the seat cushion, or the control program may open one or more relief valves to release pressurized fluid from one or more of the chambers of the seat cushion. The control program controls opening of the pump valve or relief valve(s) according to an established optimized control law in step 409 to ensure that the optimal amount of energy is absorbed. This process in step 409 is determined through an analytical optimization process taking into consideration cushion properties, impact profile, safety level, and other factors. The optimized control law is determined during cushion development, and it is programmed as part of the controller for the cushion operation control program. The control program then returns to the monitoring routine in step 402 to receive sensor data from one or more sensors in steps 403-406 and to determine in step 407 whether vehicular vibrational motion has been reduced below the predetermined threshold amount. The control program may optionally store the sensor and valve data to aid in analysis.

Figure 5:
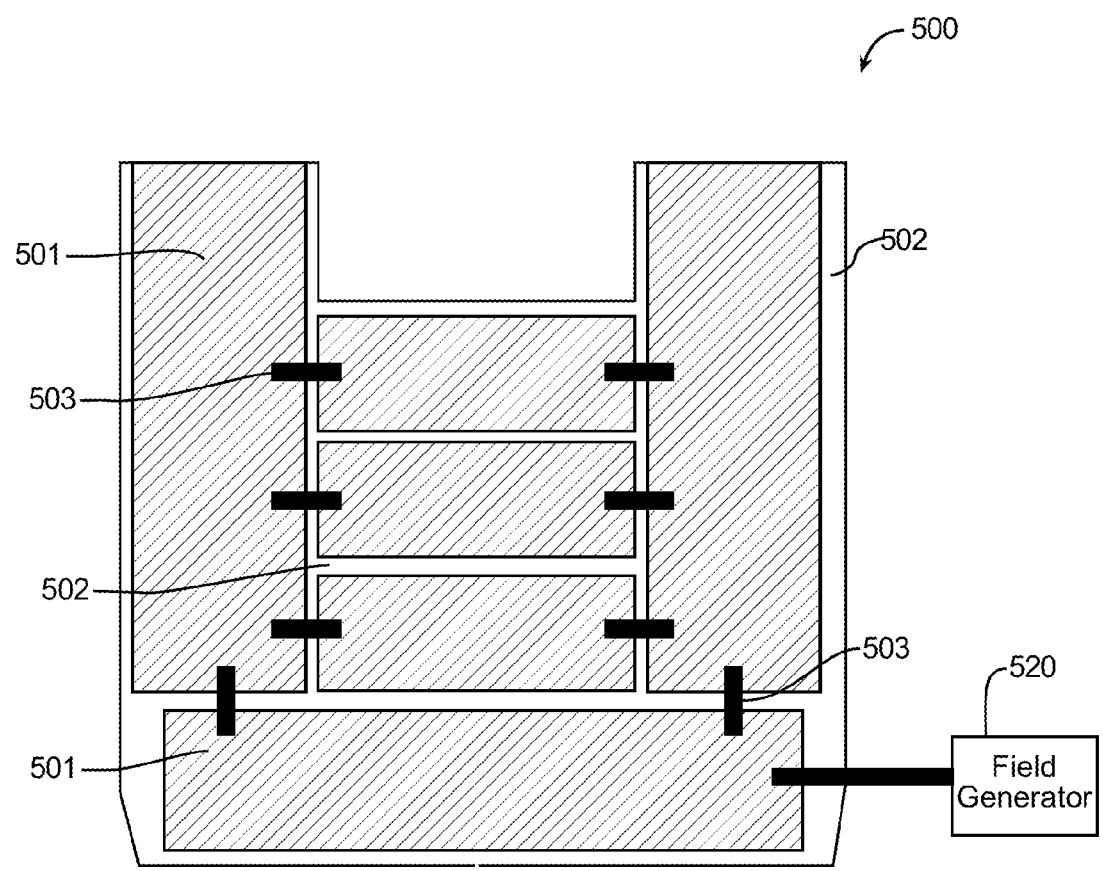
FIG. 5 is a top, cross-sectional view of a seat cushion according to another embodiment.

The present invention further includes a seat cushion 500 as depicted in FIG. 5 comprising a plurality of chambers 501. Each chamber 501 may be the same size and configuration, or the chambers 501 may be different sizes and configurations. Each chamber 501 may wrapped with a comfort foam layer 502. The comfort foam layer 502 may smooth the surface of the seat cushion 500 between the chambers 501 to eliminate gaps that may be created by chambers 501 of different size. The comfort foam layer 502 also provides a backup source of cushioning should a leak develop in one of the chambers 501. A sheepskin cover or similar material (not shown) is placed on top of the chambers 501 and the comfort foam layer 502. Persons skilled in the art will understand that the thickness of the comfort foam layer 502 and each chamber 501 may be varied, as desired, to satisfy different operational requirements and conditions. Moreover, materials other than comfort foam may be used.

The chambers 501 of the seat cushion 500 as depicted in FIG. 5 may be filled with a smart fluid such as magnetorheological fluid (MR fluid) or electrorheological fluid (ER fluid). The properties of smart fluids may be altered by application of an electromagnetic field such as a magnetic field or an electric field. MR fluids typically comprise magnetic particles such as ferroparticles suspended in a carrier fluid such as oil. The alignment and location of the magnetic particles in MR fluids may be controlled by the application of a magnetic field. Similarly, ER fluids comprise non-conductive particles in an electrically insulating carrier fluid, and the alignment and location of the non-conductive particles may be controlled by the application of an electric field.

Referring to FIG. 5, the seat cushion 500 further comprises a field generator 520. Where the chambers 501 are filled with MR fluid, the field generator 520 is configured to generate a magnetic field. Likewise, where the chambers 501 are filled with ER fluid, the field generator 520 is configured to generate an electric field. The field generator 520 may be any type of generator known in the art. Upon application of a magnetic field, the particles in MR fluids align along the line(s) of magnetic flux. Similarly, the particles in ER fluids form particle chains that are parallel to the applied field and that bridge the electrodes. The particle alignment in MR and ER fluids restricts fluid and particle motion and alters the apparent viscosity of the material, which changes from a fluid to a consistency ranging from a paste to a gel or viscoelastic solid. The properties of MR and ER fluids may be customized to a particular application by altering the size, shape, number, and composition of the particles, as well as the composition of the carrier fluid. The viscosity change in both MR and ER fluids occurs very rapidly, generally on the order of milliseconds. The viscosity change is also reversible, with the fluids returning to their original consistency and viscosity upon removal of the electromagnetic field. In another embodiment (not shown), the seat cushion 500 may comprise two or more field generators 520 such that different chambers 501 are subjected to different electromagnetic fields.

The seat cushion 500 further comprises a field controller that communicates with the field generator 520 to increase or decrease the strength or intensity of the electromagnetic field. The viscosity of smart fluids may be rapidly, accurately, and predictably controlled by varying the intensity of the electromagnetic field generated by the field generator 520. By communicating with the field generator 520 to increase or decrease the electromagnetic field intensity, the field controller may alter the consistency of the smart fluid in the seat cushion 500 to may provide near real-time adjustments to the stiffness of the seat cushion 500. The smart fluid in the seat cushion 500 thereby acts as a customizable shock absorber that adjusts the amount of support provided by the seat cushion 500 to respond to changing conditions and to dampen and isolate vibrational motion transmitted to the occupant of the seat cushion 500.

The field controller may comprise an integrated circuit or microchip, a computer or computer system, or other suitable electronic system. The field controller may be an integral component of the field generator 520, or the field controller may be a separate component located elsewhere on the seat cushion 500 or in the vehicle. The field controller may also be physically or wirelessly connected to the field generator 520.

The field controller further comprises a sensing system and a control program. The sensing system receives data from a plurality of sensors, which may include existing sensors in the vehicle and/or seat cushion 500 as well as customized sensors. The sensors are configured to detect vehicular vibrational motion by monitoring the current acceleration and motion of the seat cushion 500. The control program monitors changes in the amount or intensity of vehicular vibrational motion. When vehicular vibrational motion exceeds a predetermined threshold amount, the control program communicates with the field generator 520 to alter the intensity of the magnetic or electric field, thereby increasing or decreasing the stiffness of the seat cushion 500. The control program includes algorithms developed to determine the optimum operation of the field generator 520. Inputs to each algorithm may include the size and weight of the occupant, the desired safety level and predetermined threshold amount of vehicular vibrational motion, the pressure in each chamber 501, the motion and acceleration of the seat cushion 500, constraints or limitations on the motion of the seat cushion 500, and other factors. The output is a control law that governs the operation of the field controller and the field generator 520 to ensure that the optimal amount of energy is absorbed and that transmitted vibrational motion is isolated, dampened, and minimized.

One or more of the chambers 501 may be connected to one another by one or more orifices 503. The orifices 503 permit the smart fluid to flow between the chambers 501 and enable each chamber 501 to contain differing amounts of fluid, thereby allowing localized changes in the stiffness of each chamber 501. The capability of chambers 501 to contain different amounts of fluid enables different regions of the body to be supported with differing amounts of force by the seat cushion 500 based, for example, on different forces received from different occupants of the seat cushion 500. This differential fluid distribution capability further enables the seat cushion 500 to contour to a diverse population, including a wide range of anthropometry and different genders. The level of fluid in each chamber 501 may be adjusted to the occupant and may vary with time. The aperture in each orifice 503 may be the same or different, and the aperture may also be sized to provide semi-active cushioning to further isolate and dampen vibrations transmitted to vehicle occupants during the course of routine vehicle motion.

The number, size, and configuration of each chamber 501, the comfort foam layer 502, and each orifice 503 may also be varied to suit different requirements and operating conditions. For example, the number of chambers 501 may be increased, and the chambers 501 may be placed in more than one layer in the seat cushion 500. The chambers 501 may also be arranged in a serpentine configuration or other suitable configuration.

Figure 6:
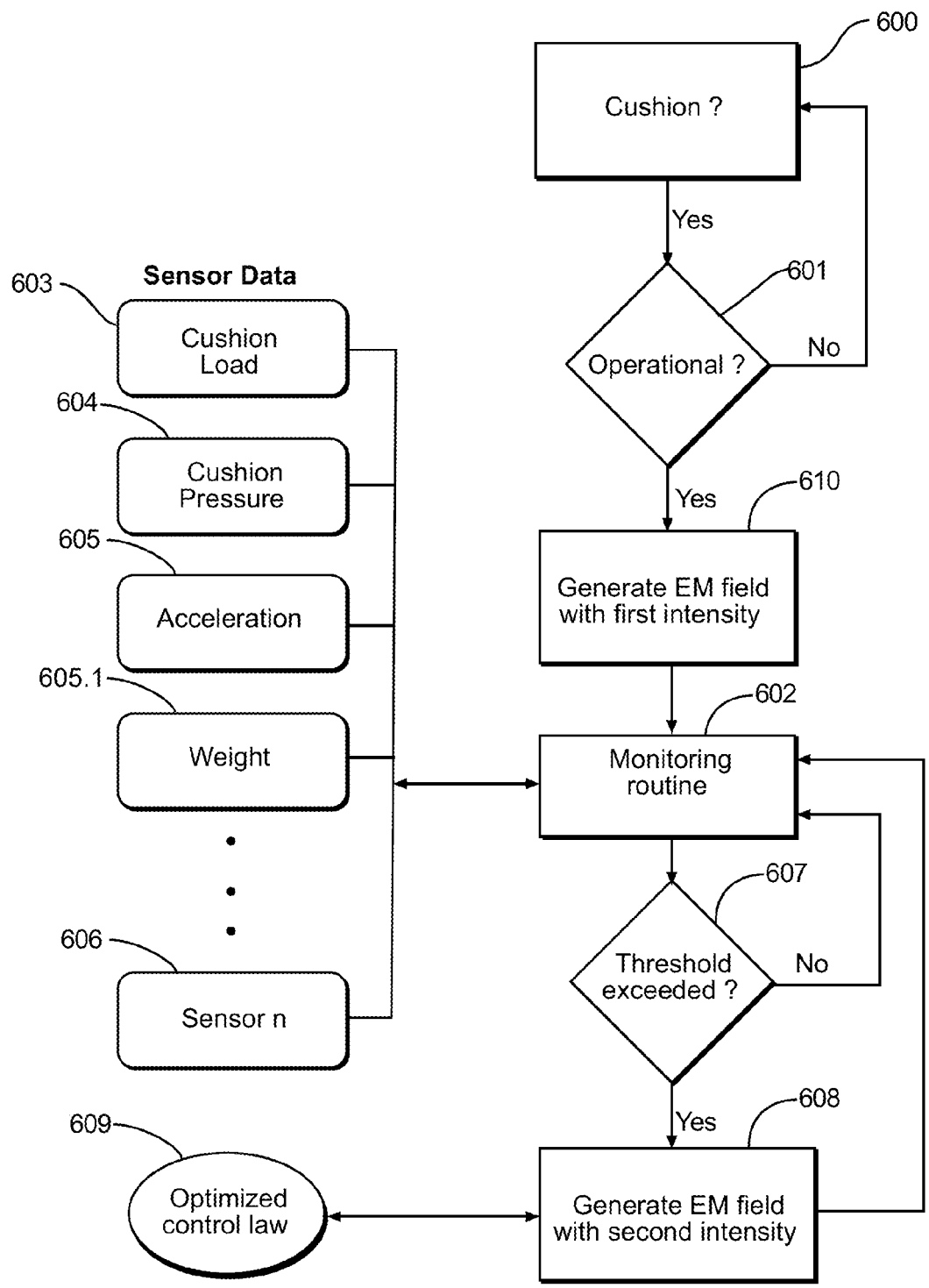
FIG. 6 is a flowchart of an alternative embodiment of a seat cushion program for isolating and damping vibrations that occur during routine vehicle use.

The present invention further includes a control program as depicted in FIG. 6 for a seat cushion containing smart fluid. The control program operates in the following manner. In step 600, the control program runs initialization routines to determine if a seat cushion is present, and in step 601, the control program runs a routine to determine if the seat cushion is operational. If a seat cushion is not detected, the program does not run any further routines, but rather continues to run a routine to determine if a seat cushion is present. If a seat cushion is detected but is not in an operational mode, the control program may perform various diagnostic routines to identify the source of the problem that prevents the seat cushion from being operational and may inform an operator or maintenance person of the problem. If the seat cushion is determined to be operational in step 601, the control program performs a routine that creates an electromagnetic field having a first field intensity in step 610. The electromagnetic field is produced by a field generator. If the smart fluid is MR fluid, the field generator produces a magnetic field. If the smart fluid is ER fluid, the field generator produces an electric field. The control program then begins running a monitoring routine in step 602 to continually assess the current acceleration and motion of the seat cushion. The routines that are run in step 602 receive sensor data from one or more sensors in steps 603-606. The sensors may include a cushion load sensor in step 603, a current pressure sensor in step 604, an acceleration sensor in step 605, a weight sensor 605.1, and any additional sensors n in step 606.

Based on sensor data received from one or more sensors in steps 603-606, the control program determines in step 607 whether vehicular vibrational motion transmitted to the occupant of the seat cushion has exceeded a predetermined threshold amount. If the predetermined threshold amount has not been exceeded, the control program resumes the monitoring routine in step 602 to receive sensor data from one or more sensors in steps 603-606. If the control program determines in step 607 that the predetermined threshold amount has been exceeded, the control program in step 608 performs a routine that alters the intensity of the electromagnetic field to create a second field intensity. In step 609, the control program alters the first field intensity according to an established optimized control law to ensure that the optimal amount of energy is absorbed and that transmitted vibrational motion is isolated and dampened. This process in step 609 is determined through an analytical optimization process taking into consideration cushion properties, impact profile, safety level, and other factors. The optimized control law is determined during cushion development, and it is programmed as part of the controller for the cushion operation control program. The control program then returns to the monitoring routine in step 602 to receive sensor data from one or more sensors in steps 603-606 and to determine in step 607 whether vehicular vibrational motion has been reduced below the predetermined threshold amount. The control program may optionally store the sensor and valve data to aid in analysis.

The foregoing disclosure has been presented for purposes of illustration and description and is not intended to be exhaustive or to limit the invention to the various embodiments and forms disclosed herein. Persons skilled in the art will realize and appreciate that many modifications and variations are possible in light of the above teaching. For example, persons skilled in the art will appreciate that many pressurized fluid mediums besides air may be used to fill a seat cushion. Moreover, the size and configuration of the seat cushion and chambers may be varied. The disclosed embodiments were chosen and described to best explain the principles of the invention and its practical application to thereby enable others skilled in the art to best use the invention in various embodiments and with various modifications suited to the particular use contemplated. The scope of the invention is to be defined by the following claims.

What is claimed is:

1. A method of absorbing energy and damping vehicular vibrational motion in a seat cushion, the method comprising the steps of:
   supplying a pressurized fluid to each of a plurality of chambers of the seat cushion, wherein the plurality of chambers are in fluid communication with one another;
   sensing whether the seat cushion is operational;
   continuously receiving sensor data from a plurality of sensors;
   determining whether vehicular vibrational motion transmitted to an occupant of the seat cushion exceeds a predetermined threshold amount; and
   opening one or more relief valves to release pressurized fluid from one or more of the plurality of chambers of the seat cushion in a controlled manner according to an optimized control law such that the seat cushion absorbs an optimal amount of energy and decreases the vehicular vibrational motion transmitted to the occupant.

2. The method of claim 1, wherein the step of continuously receiving sensor data comprises receiving data from at least one of a cushion load sensor, a current pressure sensor, and an acceleration sensor.

3. The method of claim 1, wherein the step of opening one or more relief valves to release pressurized fluid includes the step of opening a mechanical relief valve or an electronic relief valve.

4. The method of claim 1, wherein the step of releasing the pressurized fluid includes the step of opening at least one of a pump valve and a relief valve.

5. A method of absorbing energy and damping vehicular vibrational motion in a seat cushion, the method comprising the steps of:
   supplying a smart fluid to each of a plurality of chambers of the seat cushion, wherein at least some of the plurality of chambers are in fluid communication with one another;
   sensing whether the seat cushion is operational;
   supplying an electromagnetic field having a first field intensity, wherein at least one property of the smart fluid is altered upon application of the electromagnetic field having the first field intensity;
   continuously receiving sensor data from a plurality of sensors;
   determining whether the vehicular vibrational motion transmitted to an occupant of the seat cushion exceeds a predetermined threshold amount; and
   altering the first field intensity in a controlled manner according to an optimized control law to create a second field intensity, wherein at least one property of the smart fluid is altered upon application of the electromagnetic field having the second field intensity such that the seat cushion absorbs an optimal amount of energy and decreases vehicular vibrational motion transmitted to the occupant.

6. The method of claim 5 wherein the step of continuously receiving sensor data comprises receiving data from at least one of a cushion load sensor, a current pressure sensor, an acceleration sensor, and a weight sensor.

7. The method of claim 5 wherein the smart fluid is a magnetorheological fluid and wherein the electromagnetic field is a magnetic field.

8. The method of claim 5 wherein the smart fluid is an electrorheological fluid and wherein the electromagnetic field is an electric field.

9. A semi-active seat cushion system, comprising:
   a smart fluid, wherein at least one property of the smart fluid is altered upon application of an electromagnetic field;
   a plurality of chambers configured for containing the smart fluid, wherein at least one chamber is connected to at least one other chamber by an orifice that permits the smart fluid to flow between the chambers;
   at least one field generator, wherein the field generator is configured to produce the electromagnetic field, the field generator being capable of altering an intensity of the electromagnetic field; and
   a field controller in communication with the field generator, wherein the field controller controls the intensity of the electromagnetic field generated by the field generator to optimize the amount of energy that is absorbed by the seat cushion;
   wherein the field controller further comprises a sensing system configured to receive sensor data from a plurality of sensors, wherein the sensors detect a change in vehicular vibrational motion; and
   wherein the field controller further comprises a control program, wherein the control program is configured to receive the sensor data and communicate with the field generator to alter the intensity of the electromagnetic field.

* * * * *